US006053267A

United States Patent [19]

Fisher

[11] Patent Number: 6,053,267

[45] Date of Patent: Apr. 25, 2000

[54] COATING REMOVAL VEHICLE WITH INFLATABLE SUCTION RING

[75] Inventor: Francis P. Fisher, Evergreen, Colo.

[73] Assignee: Technical Mechanical Resource Associates, Inc., Lakewood, Colo.

[21] Appl. No.: 09/104,651

[22] Filed: Jun. 25, 1998

[51] Int. Cl.[7] ..................... B62B 39/00

[52] U.S. Cl. ..................... 180/164; 180/901

[58] Field of Search ..................... 180/164, 901; 114/296, 222; 248/205.9, 206.2, 206.4; 277/646, 913

[56] References Cited

U.S. PATENT DOCUMENTS

| | | | |
|---|---|---|---|
| 2,976,875 | 3/1961 | Hoffman | 180/164 |
| 3,209,849 | 10/1965 | Gondert et al. . | |
| 3,268,023 | 8/1966 | Di Napoli . | |
| 3,609,916 | 10/1971 | Hammelmann . | |
| 3,682,265 | 8/1972 | Hiraoka et al. . | |
| 3,892,287 | 7/1975 | Bennett | 180/115 |
| 3,926,277 | 12/1975 | Shino et al. . | |
| 3,960,229 | 6/1976 | Shio . | |
| 3,991,842 | 11/1976 | Larsen . | |
| 4,095,378 | 6/1978 | Urakami . | |
| 4,100,641 | 7/1978 | Pansini | 180/164 |
| 4,477,998 | 10/1984 | You . | |
| 4,664,212 | 5/1987 | Nagatsuka et al. . | |
| 4,789,037 | 12/1988 | Kneebone . | |
| 4,890,567 | 1/1990 | Caduff | 114/222 |
| 4,934,475 | 6/1990 | Urakami . | |
| 4,971,591 | 11/1990 | Raviv et al. . | |
| 5,007,210 | 4/1991 | Urakami . | |
| 5,014,803 | 5/1991 | Urakami . | |
| 5,285,601 | 2/1994 | Watkins et al. . | |
| 5,536,199 | 7/1996 | Urakami . | |
| 5,588,900 | 12/1996 | Urakami . | |
| 5,592,998 | 1/1997 | Urakami . | |
| 5,752,577 | 5/1998 | Urakami | 180/164 |

FOREIGN PATENT DOCUMENTS

| | | | |
|---|---|---|---|
| 4166480 | 6/1992 | Japan | 180/164 |

*Primary Examiner*—J. J. Swann
*Assistant Examiner*—Michael Cuff
*Attorney, Agent, or Firm*—Dorr, Carson, Sloan & Birney, P.C.

[57] ABSTRACT

A suction-adhering vehicle for removing a coating from a surface includes an inflatable member (e.g., a tubular ring or an inner tube) defining a substantially enclosed region between vehicle frame and the surface. Spray nozzles within the enclosed region direct fluid against the surface to remove the coating. An exhaust port leading from the enclosed region is connect to an external suction source that maintains reduced pressure within the enclosed region and withdraws fluid and coating debris from within the enclosed region. Caterpillar treads or other drive means move the vehicle along the surface. The inflatable ring is releasably secured to the vehicle frame by a frictional fit with engaging means extending from the frame, such as collar that engages the inside diameter or the outside diameter of the inflatable ring. This allows the inflatable ring to be quickly and easily replaced in the field. The orientation of the inflatable ring can also be reversed so that both sides of the ring are used as wear surfaces. The wear surfaces of the inflatable ring can be coated with polyurea, metal powder, or other wear-resistant materials to increase its useful life.

17 Claims, 3 Drawing Sheets

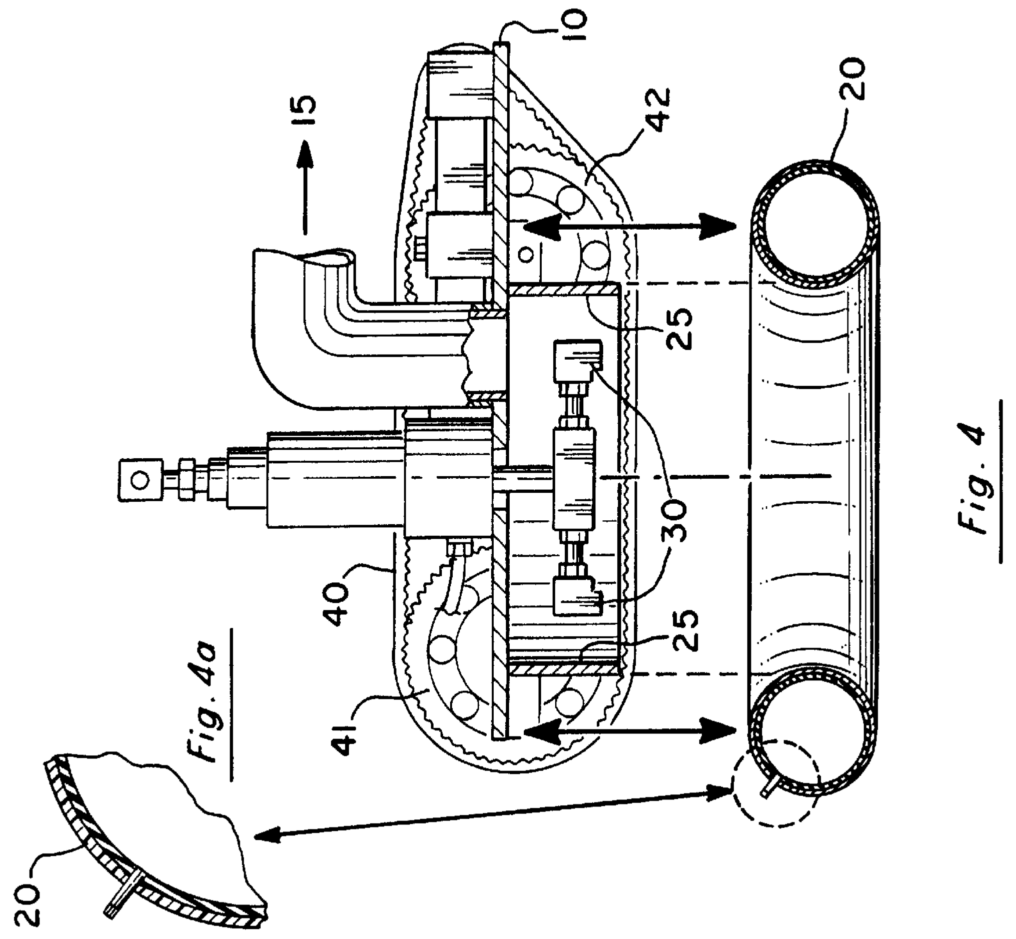
Fig. 4a
Fig. 4
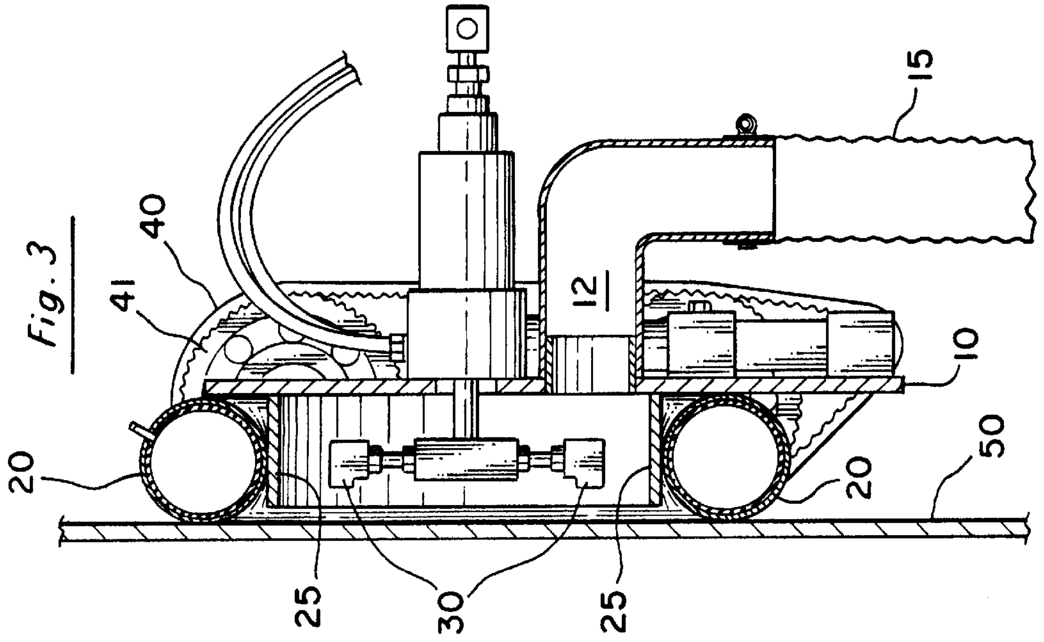
Fig. 3

COATING REMOVAL VEHICLE WITH INFLATABLE SUCTION RING

BACKGROUND OF THE INVENTION

1. Field of the Invention

The present invention relates generally to the field of vehicles used for removing coatings from surfaces. More specifically, the present invention discloses a coating removal vehicle equipped with an inflatable suction ring that can be quickly and easily reversed or replaced in the field to minimize downtime.

2. Statement of the Problem

Various types of crawlers have long been used for cleaning or removing coatings from surfaces. For example, magnetic crawlers are sometimes used in cleaning and painting the hulls of ships. These vehicles typically have caterpillar tracks with a series of magnets spaced along their periphery that hold the vehicle to the ship hull. The tracks are propelled by means of hydraulic, pneumatic, or electric motors to move the vehicle along the hull. The frame of such devices can be used to carry sandblasting equipment, spray nozzles for cleaning, spray painting equipment, and the like. The direction and speed of the vehicle is remotely controlled by an operator via radio or wire.

Other types of crawlers employ suction to hold the device to the surface. These devices typically employ either a series of smaller suction devices mounted on endless tracks, or a larger suction device mounted on the frame of the device. This approach has the advantage of not being limited to ferrous surfaces. In addition, the suction can also be used to remove water and debris resulting from cleaning the surface. Such devices usually require a flexible skirt or partition to define a low pressure region between the crawler and the surface. However, normal wear and abrasion quickly damages the partition, so that some prior art devices are only capable of operation for a few hours before the partition must be replaced. Additionally, many prior art devices require extensive, time-consuming disassembly to replace the partition. All of this results in substantial expense and downtime to maintain the flexible partition.

The following list includes representative examples of the prior art in the field of crawlers used for removing coatings, cleaning, and painting:

| Inventor | Patent No. | Issue Date |
|---|---|---|
| Gondert et al. | 3,209,849 | Oct. 5, 1965 |
| DI Napoli | 3,268,023 | Aug. 23, 1966 |
| Hammelmann | 3,609,916 | Oct. 5, 1971 |
| Shino et al. | 3,926,277 | Dec. 16, 1975 |
| Shio | 3,960,229 | June 1, 1976 |
| Larsen | 3,991,842 | Nov. 16, 1976 |
| Kneebone | 4,789,037 | Dec. 6, 1988 |
| Hiraoka et al. | 3,682,265 | Aug. 8, 1972 |
| Urakami | 4,095,378 | June 20, 1978 |
| You | 4,477,998 | Oct. 23, 1984 |
| Nagatsuka, et al. | 4,664,212 | May 12, 1987 |
| Urakami | 4,934,475 | June 19,1990 |
| Raviv et al. | 4,971,591 | Nov. 20, 1990 |
| Urakami | 5,007,210 | Apr. 16, 1991 |
| Urakami | 5,014,803 | May 14, 1991 |
| Watkins et al. | 5,285,601 | Feb. 15, 1994 |
| Urakami | 5,536,199 | July 16, 1996 |
| Urakami | 5,588,900 | Dec. 31, 1996 |
| Urakami | 5,592,998 | Jan. 14, 1997 |

Gondert et al. disclose a towing vehicle that uses suction to increase traction between the vehicle and the supporting surface.

Di Napoli discloses a self-propelled load transport device that is supported on an air bearing.

Hammelmann discloses a cleaning apparatus for ships' hulls. Each working nozzle discharges jets of highly pressurized water through intercepting nozzles that create suction which counteracts the reaction forces and causes rollers to bear against the surface and maintain a predetermined minimum distance from the outlets of the intercepting nozzles.

Shino et al. disclose a vehicle having a hollow body that is drawn under suction against the surface over which the vehicle travels. Raviv et al. disclose another example of a vehicle with vacuum traction.

Nagatsuka et al. disclose a vacuum wall crawler having a pair of endless belts with a series of recesses that provide suction to hold the crawler to a wall. Larsen discloses another example of a vacuum wall crawler having an endless track with a series of cavities providing suction to hold the device to a surface.

Hiraoka et al. disclose a magnetic vehicle with a large central magnet and a series of lateral magnets. Kneebone, Shio, and Watkins et al. disclose other examples of magnetic tracked vehicles.

You discloses a wall-climbing toy having a series of suction disks mounted on an endless belt.

The Urakami '378 patent discloses a device capable of suction-adhering to a wall surface and moving along the wall. The device includes a rigid housing and a plurality of wheels or endless tracks for navigation. A flexible partition extending from the housing defines a substantially fluid-tight lower pressure area between the housing and surface.

The Urakami '475 and '210 patents disclose suction-adhering devices similar to that shown in the Urakami '378 patent, but also include vibration generating means (e.g., a piston and cylinder mechanism, or an eccentric weight secured to a rotating shaft) to move the device along the wall.

The Urakami '803 patent shows a suction-adhering device with a partitioning member 50 having an outer wall portion 54 and an inner wall portion 56. The pressure in the space within the partitioning member can be adjusted The partitioning member is apparently bolted to the frame of the device. The '803 patent mentions that the partitioning member can be formed of polyurethane rubber or synthetic resins. (column 3, lines 56–58).

The Urakami '199 patent discloses a suction-adhering device with a pair of oscillating frames. The embodiment illustrated in FIGS. 17 and 18 of the Urakami '199 patent regulates the pressure within the suction-adhering sealing means (suction ring) 80 as a function of the pressure measured within the enclosed housing 10.

The Urakami '900 patent discloses a suction-adhering device with a swivel bearing and crank mechanism carrying the cleaning nozzle.

The Urakami '998 patent shows a suction-adhering device with double-walled partitioning means 14 bolted to the frame, and a lower lip portion 106 that extends radially outward. The Urakami '998 patent also mentions that the partitioning means can be made of synthetic rubber such as urethane rubber (column 5, lines 45–47).

3. Solution to the Problem

None of the prior art references discussed above show a suction-adhering device with an inflatable suction ring that is held to the vehicle by friction fit around a cylindrical collar. This configuration permits the ring to be quickly and easily replaced in the field to minimize downtime.

SUMMARY OF THE INVENTION

This invention provides a suction-adhering vehicle for removing a coating from a surface that includes an inflatable member (e.g., a tubular ring or an inner tube) defining a substantially enclosed region between vehicle frame and the surface. Spray nozzles within the enclosed region direct fluid against the surface to remove the coating. An exhaust port leading from the enclosed region is connect to an external suction source that maintains reduced pressure within the enclosed region and withdraws fluid and coating debris from within the enclosed region. Caterpillar treads or other drive means move the vehicle along the surface. The inflatable ring is releasably secured to the vehicle frame by a frictional fit with engaging means extending from the frame, such as collar that engages the inside diameter or the outside diameter of the inflatable ring. This allows the inflatable ring to be quickly and easily replaced in the field. The orientation of the inflatable ring can also be reversed so that both sides of the ring are used as wear surfaces. The wear surfaces of the inflatable ring can be coated with polyurea, metal powder, or other wear-resistant materials to increase its useful life.

A primary object of the present invention is to provide a vehicle for removing coatings from surfaces that can be quickly and easily maintained in the field.

Another object of the present invention is to provide a vehicle for removing coatings from surfaces that is more cost-effective than prior art devices.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 3 is a side cross-sectional view of the vehicle with the inflatable ring removed.

FIG. 4 is a side cross-sectional view of the vehicle with the inflatable ring attached.

DETAILED DESCRIPTION OF THE INVENTION

Figure 1:
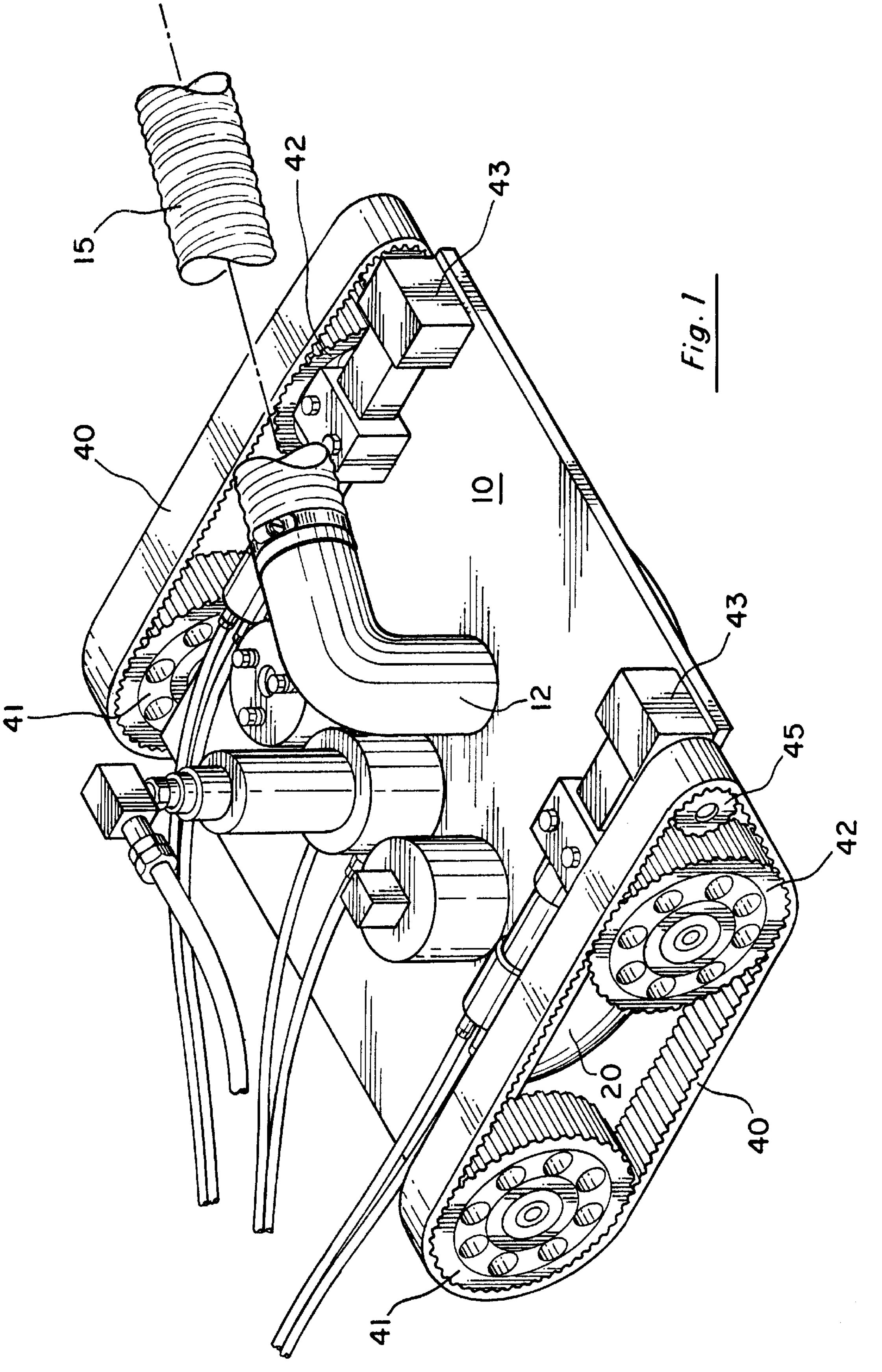
FIG. 1 is a top perspective view of the vehicle.
Figure 2:
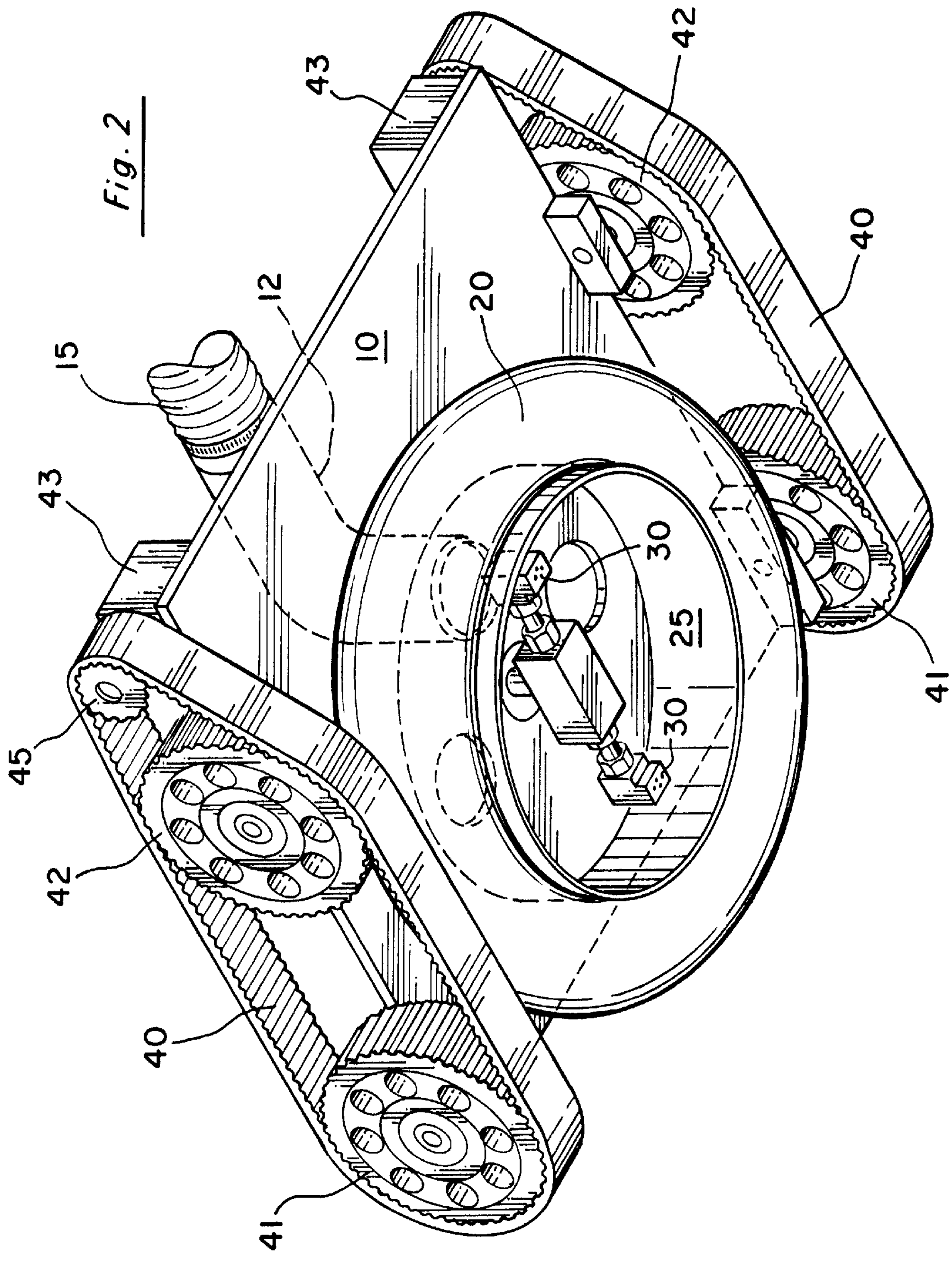
FIG. 2 is a bottom perspective view of the vehicle.

Turning to FIGS. 1 and 2, top and bottom perspective views of the entire vehicle are provided. The present device generally consists of a frame 10, an inflatable suction ring 20 located beneath the frame, a spray mechanism 30 located in the enclosed region within the ring and beneath the frame, and two caterpillar tracks 40 used to move the vehicle.

More specifically, the frame 10 provides a rigid support carrying the remaining components of the assembly. An inflatable member 20 is removably attached to the underside of the frame 10 as illustrated in FIG. 2. When the vehicle is in use, this inflatable member 20 is sandwiched between the frame 10 and the surface 50 being treated, as depicted in FIG. 3. In the preferred embodiment, the inflatable member 20 is a tubular rubber ring, such as a conventional inner tube used in tires. However, other annular shapes and other flexible materials could be readily substituted for the inflatable ring 20.

The region enclosed by the vehicle frame 10, surface 50, and inflatable ring 20 serves several functions. A suction port 12 connects the enclosed region to an external suction means for maintaining reduced pressure within the enclosed region. This reduced pressure tends to hold the entire vehicle to the surface 50. Second, a spray mechanism 30 carrying a series of spray nozzles is located within the enclosed region to deliver a high-velocity stream of water, solvent or sand supplied by an external source against the surface 50 to remove the undesired coating. The coating-removal material is substantially confined within the enclosed region to minimize clean-up. Third, the suction line 15 withdraws fluid and coating debris from within the enclosed region to further simplify clean-up and disposal of debris.

The vehicle is propelled and steered by two caterpillar tracks 40 located on either side of the frame 10. Each track 40 is driven by a hydraulic motor 43, which turns a small drive wheel 45. Each track 40 also passes around two larger wheels 41 and 42 rotatably mounted to the frame 10. The hydraulic motors 43 can be individually controlled by a remote user to adjust the speed and direction of the vehicle. In the preferred embodiment, the caterpillar tracks are rubberized treads to maximize traction. However, it should be understood that other drive means could be readily substituted, such as other types of endless belts or wheels. If the vehicles is to be used on ferrous surfaces, a series of magnets or electromagnets can be attached to the tracks 40 or frame 10 to supplement the attractive force between the vehicle and the surface 50. It should also be noted that other drive means could be substituted for the hydraulic motors, such as an electric motors, pneumatic motors, or a small internal combustion engine.

In the preferred embodiment of the vehicle, the inflatable ring 20 is removably secured to the frame 10 by a substantially cylindrical collar 25 extending downward from the lower surface of the frame 10. The collar 25 has an outside diameter slightly larger than the inside diameter of the inflatable ring 20 so that the ring 20 can be stretched around the collar 25 as shown in FIG. 4. This frictional fit is sufficient to hold the inflatable ring 20 in place while the vehicle is in use, but the ring 20 can be readily released by the user when it becomes necessary to replace the ring. This embodiment also has the advantage of using the collar 25 to shield most of the inflatable ring 20 from the spray and debris. Only the lower surface of the inflatable ring 20 is subject to wear and abrasion against the surface 50.

It should be understood that other types of engaging means could be employed to removably secure the inflatable ring 20 to the vehicle frame 10. For example, a larger-diameter collar 25 could be use to frictionally engage the outside diameter of the inflatable ring 20. In this embodiment, the inflatable ring 20 is held inside the collar 25. In another embodiment, the one-piece collar 25 is replaced by a plurality of protrusions, ribs, fingers, or clips arranged in a suitable pattern on the underside of the frame 10 to engage the inflatable ring 20. The flexible, annular shape of the inflatable ring 20 allows a wide range of options in this regard.

As previously mentioned, the spray mechanism 30 is located within the enclosed region, and preferably within the collar 25. Here again, a wide variety of nozzles and swivel mechanisms can be employed. In the preferred embodiment, two nozzles are mounted at opposing ends of a T-shaped swivel assembly that is free to rotate about a vertical axis. The nozzles are pointed downward. However, even a slight off-vertical alignment is sufficient to cause the swivel assembly to spin rapidly and thereby sweep out a circular pattern on the surface 50 beneath the enclosed region of the vehicle. For example, the vehicle can be used for removing coatings such as paint, adhesives, dirt, scale, and asbestos from the surface 50.

A number of improvements are possible to maximize the useful life of the inflatable ring 20. For example, the inflatable ring 20 can be fabricated from wear-resistant materials. However, custom fabrication tends to increase costs and requires maintenance and distribution of an inventory of inflatable rings for use as spare parts. In contrast, conventional rubber inner tubes are universally available at nominal cost. These advantages may outweigh the somewhat inferior wear characteristics and shorter useful life associated with using conventional inner tubes. Nonetheless, the present invention also has the advantage of allowing the orientation of the inner tube to be easily reversed so that both sides of the inner tube can be used as the wear surface for the ring. This essentially doubles useful life of the inflatable ring 20.

Wear-resistant coatings can be applied to the inflatable ring 20 to increase its useful life. For example, polyurea or other urethane coatings can be applied to the wear surfaces of the inflatable ring 20. Alternatively, metal powders, ceramic powders, or other abrasion-resistant coatings can be bonded to the wear surfaces of the inflatable ring 20 to increase its wear resistance.

The above disclosure sets forth a number of embodiments of the present invention. Other arrangements or embodiments, not precisely set forth, could be practiced under the teachings of the present invention and as set forth in the following claims.

I claim:

1. A vehicle for removing a coating from a surface comprising:

a frame;

an inflatable member defining a substantially enclosed region between said frame and the surface;

engaging means extending from said frame for releasably securing said inflatable member to said frame by a frictional fit between said engaging means and said inflatable member;

said inflatable member further comprises two opposing sides, and wherein the orientation of said inflatable member on said frame is reversible so that either of said sides can be placed in contact with said surface;

spray means within said enclosed region directing fluid against the surface to remove the coating;

means for maintaining reduced pressure within said enclosed region and withdrawing said fluid and coating debris from within said enclosed region; and drive means for moving the vehicle along the surface.

2. The vehicle of claim 1 wherein said inflatable member comprises a tubular ring having an inside diameter and an outside diameter.

3. The vehicle of claim 2 wherein said engaging means comprise a substantially cylindrical collar engaging the inside diameter of said tubular ring.

4. The vehicle of claim 2 wherein said engaging means comprise a substantially cylindrical collar engaging the outside diameter of said tubular ring.

5. The vehicle of claim 2 wherein said tubular ring comprises an inner tube.

6. The vehicle of claim 1 wherein said inflatable member comprises a coating of polyurea.

7. The vehicle of claim 1 wherein said inflatable member further comprises a coating of metal powder.

8. A vehicle for removing a coating from a surface comprising:

a frame;

an inflatable tubular ring defining a substantially enclosed region between said frame and the surface;

at least one engaging member extending from said frame and providing a frictional fit with said tubular ring for releasably securing said tubular ring to said frame;

said tubular ring further comprises two opposing sides, and wherein the orientation of said inflatable member on said frame is reversible so that either of said sides can be placed in contact with said surface;

spray means within said enclosed region directing fluid against the surface to remove the coating;

means for maintaining reduced pressure within said enclosed region and withdrawing said fluid and coating debris from within said enclosed region; and drive means for moving the vehicle along the surface.

9. The vehicle of claim 8 wherein said engaging member comprises a substantially cylindrical collar.

10. The vehicle of claim 9 wherein said collar engages the inside diameter of said tubular ring.

11. The vehicle of claim 9 wherein said collar engages the outside diameter of said tubular ring.

12. The vehicle of claim 8 wherein said tubular ring comprises an inner tube.

13. The vehicle of claim 8 wherein said tubular ring comprises a coating of polyurea.

14. The vehicle of claim 8 wherein said tubular ring comprises a coating of metal powder.

15. A vehicle for removing a coating from a surface comprising:

a frame;

an inflatable tubular ring having an inside diameter;

a substantially cylindrical collar extending from said frame and having an outside diameter slightly larger than the inside diameter of said tubular ring, thereby providing an frictional fit for releasably securing said tubular ring to said frame;

said tubular ring further comprises two opposing sides, and wherein the orientation of said inflatable member on said frame is reversible so that either of said sides can be placed in contact with said surface;

spray means within said cylindrical collar for directing fluid against the surface to remove the coating;

means for maintaining reduced pressure within said cylindrical collar and for withdrawing said fluid and coating debris from within said cylindrical collar; and drive means for moving the vehicle along the surface.

16. The vehicle of claim 15 wherein said tubular ring comprises an inner tube.

17. The vehicle of claim 15 wherein said tubular ring comprises a coating of polyurea.

* * * * *